I. G. JIRKA.
CLAMP MOUTH MIRROR.
APPLICATION FILED FEB. 24, 1913.
1,079,414.
Patented Nov. 25, 1913.
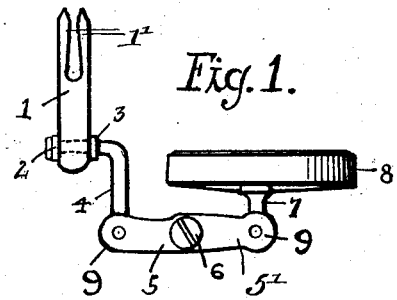
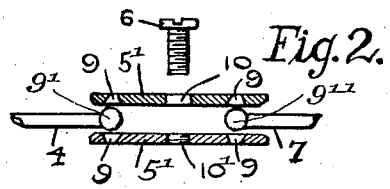
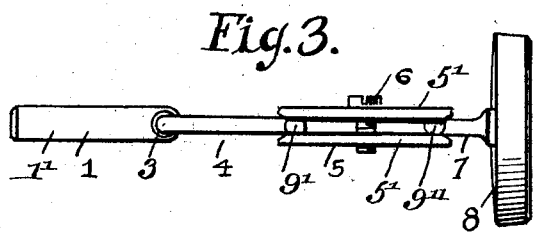
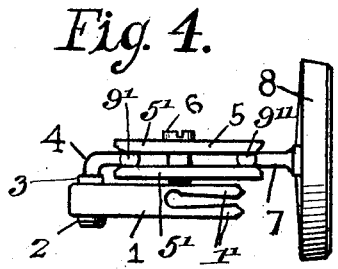
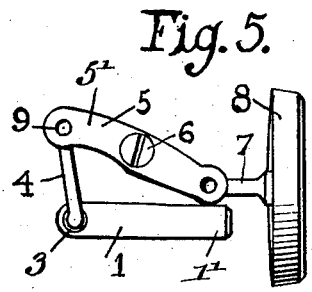
WITNESSES:
Robert Hugo Jirka.
Sylvia A. Jirka.
INVENTOR.
Irwin Grover Jirka.
BY
Harold W. Jirka
ATTORNEY.

UNITED STATES PATENT OFFICE.

IRWIN G. JIRKA, OF CHICAGO, ILLINOIS.

CLAMP MOUTH-MIRROR.

1,079,414.  Specification of Letters Patent. Patented Nov. 25, 1913.

Application filed February 24, 1913. Serial No. 750,366.

*To all whom it may concern:*

Be it known that I, IRWIN GROVER JIRKA, a citizen of the United States of America, residing at Chicago, county of Cook, and State of Illinois, have invented a certain new and useful Improvement in a Dental Instrument, which I designate as a Clamp Mouth-Mirror, and of which the following is a specification.

My invention relates to dental appliances and particularly to a mouth mirror and improved support for the same.

The object of my invention is to provide a mouth mirror with means whereby the same may be readily supported in such a position with relation to the tooth operated upon that a constant light will be projected on the work or the work constantly and steadily reflected on the mirror.

A further object of my invention is to provide a device as mentioned in which the mirror shall be maintained in constant position with relation to the work without clamping the same to the teeth or head of the patient.

Further objects of my invention are to provide a device as above mentioned in which the mirror may be readily adjusted into any desired position, which shall be compact and of such dimensions as not to interfere with the work or be inconvenient to the patient.

Other objects will appear hereinafter.

With these objects in view my invention consists generally in a mirror, a universally adjustable support for the same and means on said support for securing the device to the rubber dam clamp.

My invention further consists in the mirror and adjustable support including a ball and socket connection between the mirror and the support eccentrically fixed to the mirror mounting.

My invention further consists in various details of construction and arrangement of parts all as will be fully described hereinafter and particularly pointed out in the claim.

My invention will be more readily understood by reference to the accompanying drawings forming a part of this specification and in which—

Figure 1 is a side elevation of the device in position to be secured to a clamp on the upper teeth, Fig. 2 is a detail sectional view of one portion of the adjustable support, Fig. 3 is a top plan view of the device in extended position, Fig. 4 is a side elevation of the device in position to be attached to a clamp on the back teeth, either upper or lower, or on the lower front teeth, and Fig. 5 is a plan view of the device as shown in Fig. 4.

Referring now to the drawings 8 indicates the mirror frame or backing and mirror, 1 the clamp for securing the device to the bow of the rubber dam clamp and 4 and 5 sections of the adjustable support connecting the mirror and the clamp 1. The clamp member 1 is formed of an elongated piece of tempered steel, preferably rectangular in cross section and bifurcated at one end forming a pair of spring jaws 1' adapted to receive the bow of the rubber dam clamp between them and firmly clamp upon the same. The inner faces of the jaws 1' are outwardly flared at the ends to facilitate placing the device on the bow.

The section 4 of the adjustable support is swiveled to the opposite end of the member 1 from the jaws 1', and comprises a rod bent to form a pair of arms at right angles to each other. One arm of the section 4 extends through the member 1 at right angles to the plane of the kerf between the jaws 1' and is provided with an annular collar 3 that abuts one face of the clamp member 1. A washer 2 is arranged on the opposite side of the member 1 and the end of the arm of the section riveted over the washer to secure the section to the clamp 1. The free end of the opposite arm of the section 4 is formed with a spherical head or ball 9' for a purpose hereinafter described.

Fixed to the back of the mirror 8 and preferably at right angles to the plane thereof is a stem 7. This is preferably rigidly connected to the mirror and secured eccentrically thereto. The end of the stem 7 is provided with a ball 9'' similar to the ball 9'.

The section 5 comprises a pair of elongated parallel plates 5' provided in their adjacent faces near their outer ends with recesses 9 forming sockets for the balls 9' and 9''. A screw 6 extends centrally through an aperture 10 in one of said plates and threaded into a similar aperture 10' in the opposite plate, the screw 6 serving to hold the plates together and clamp the same on the balls 9' and 9''.

In using the device the clamp 1 is secured to the rubber dam clamp by causing the spring jaws 1' to embrace or clamp the bow of the rubber dam clamp; and it is obvious that after the clamp 1 is in position the mirror may be adjusted in any desired position by the dentist to throw light upon the work or so that the work is entirely within his view as reflected in the mirror. Furthermore, by having the mirror and support clamped to the rubber dam clamp the mirror is held in proper relative position with relation to the work irrespective of any movement of the head of the patient.

I claim:

In a device of the class described, a clamp comprising an elongated member bifurcated at one end forming a pair of spring jaws adapted to engage the clamp of a rubber dam, the opposite end of said clamp being provided with a transverse perforation, a support section comprising a rod bent to form a pair of angularly disposed arms, one of said arms being swiveled in said perforation, the free end of the other arm terminating in a ball, a mirror, a stem on said mirror terminating in a ball and a support section comprising a pair of parallel plates provided on their inner faces adjacent the ends with sockets to receive said balls respectively and means for clamping said plates upon said balls, substantially as described.

In testimony whereof I have signed my name to this specification in the presence of two subscribing witnesses.

IRWIN G. JIRKA.

In presence of—
FRANK J. JIRKA,
HAROLD W. JIRKA.